United States Patent [19]

Gedney et al.

[11] Patent Number: 5,209,483
[45] Date of Patent: May 11, 1993

[54] TRANSDUCING AND ANALYZING FORCES FOR INSTRUMENTED SPORTING DEVICES AND THE LIKE

[75] Inventors: Charles J. Gedney, Sudbury; Philip A. Abbot, Lexington, both of Mass.

[73] Assignee: G&A Associates, Lexington, Mass.

[21] Appl. No.: 687,830

[22] Filed: Apr. 19, 1991

[51] Int. Cl.⁵ ............................................. A63B 69/36
[52] U.S. Cl. ............................. 273/187.4; 273/185 R; 273/186.2; 73/862.66; 73/862.04; 73/490; 73/774; 73/862.041; 73/862.628
[58] Field of Search .......... 273/183 R, 183 D, 184 R, 273/185 R, 186 R, 186 A, 193 R; 73/862.04, 862.66, 488, 489, 490, 763, 767, 768, 770, 774

[56] References Cited

U.S. PATENT DOCUMENTS

| | | |
|---|---|---|
| 3,438,634 | 4/1969 | Roy . |
| 3,792,863 | 2/1974 | Evans ............................... 273/186 A |
| 4,088,324 | 5/1978 | Farmer ............................. 273/186 A |
| 4,094,504 | 6/1978 | Barasch . |
| 4,138,118 | 2/1979 | Budney . |
| 4,175,445 | 11/1979 | Templeton, III ...................... 73/768 |
| 4,523,759 | 6/1985 | Igarashi . |
| 4,659,090 | 4/1987 | Kustanovich . |
| 4,759,219 | 7/1988 | Cobb et al. . |
| 4,802,371 | 2/1989 | Calderara et al. ................ 73/862.04 |
| 4,822,042 | 4/1989 | Landsman . |
| 4,898,389 | 2/1990 | Plutt . |
| 4,940,236 | 7/1990 | Allen ............................... 273/183 D |
| 4,991,850 | 2/1991 | Wilhelm .......................... 273/186 A |

FOREIGN PATENT DOCUMENTS

WO8404692 12/1984 PCT Int'l Appl. .
WO8905174 6/1989 PCT Int'l Appl. .

OTHER PUBLICATIONS

"Computer Golf Pro" advertisement for Computer Shot Analyzer, p. 39.
Penwalt Chemicals-Equipment Health Products, Kynar Piezo Film Catalog, Kynar Piezo Film Product Summary and Price List, 1988, and Kynar Piezo Film Film Technical Manual, 1987, p. 3.

"Golf Day Catalog" advertisement for StrokeMaster, Spring 1991, p. 30.
Sportech Swing Analyzer brochure, Sports Technology, Inc., pp. 1-5.
Bridgestone Science Eye HD-01 brochure, "Handy 01", Bridgestone Sports (U.S.A.) Inc. pp. 1-4.
"Golf Digest" advertisement for The Sharper Image, Dec. 1987, p. 141.
"Golf Digest" advertisement for Club Meter, Oct. 1989, p. 121.
"Golf Digest" advertisement for Accu-Drive, Dec. 1989, p. 186.
"Computer Golf Pro" advertisement for Computer Shot Analyzer, p. 39.
Pennwalt KYNAR Piezo Film catalog; KYNAR Piezo Film Product Summary and Price List, 1988; and KYNAR Piezo Film, Technical Manual, 1987.

Primary Examiner—Jessica J. Harrison
Attorney, Agent, or Firm—Fish & Richardson

[57] ABSTRACT

A device that characterizes the trajectory followed by a movable object after a piece of sporting equipment comes into contact with the movable object, e.g., by identifying velocity, the distance that the object would travel if unobstructed in standard ideal conditions, the curvature of the path travelled by the object, the direction of travel of the object, or the direction or magnitude of spin of the object. The device includes at least one force sensor element arranged to be located on the piece of sporting equipment, which is held or worn by a user. The sensor element detects at least a component of the force of contact between the piece of sporting equipment and the movable object. The sensor element provides a signal representing the intensity of the component of the force of contact when the contact occurs. An electrical processing circuit is arranged to receive the signal from the sensor element and to process the signal to produce an output characterizing the trajectory of the movable object. A user notification device is arranged to receive the output from the electrical processing circuit and to present to the user information characterizing the trajectory.

22 Claims, 6 Drawing Sheets

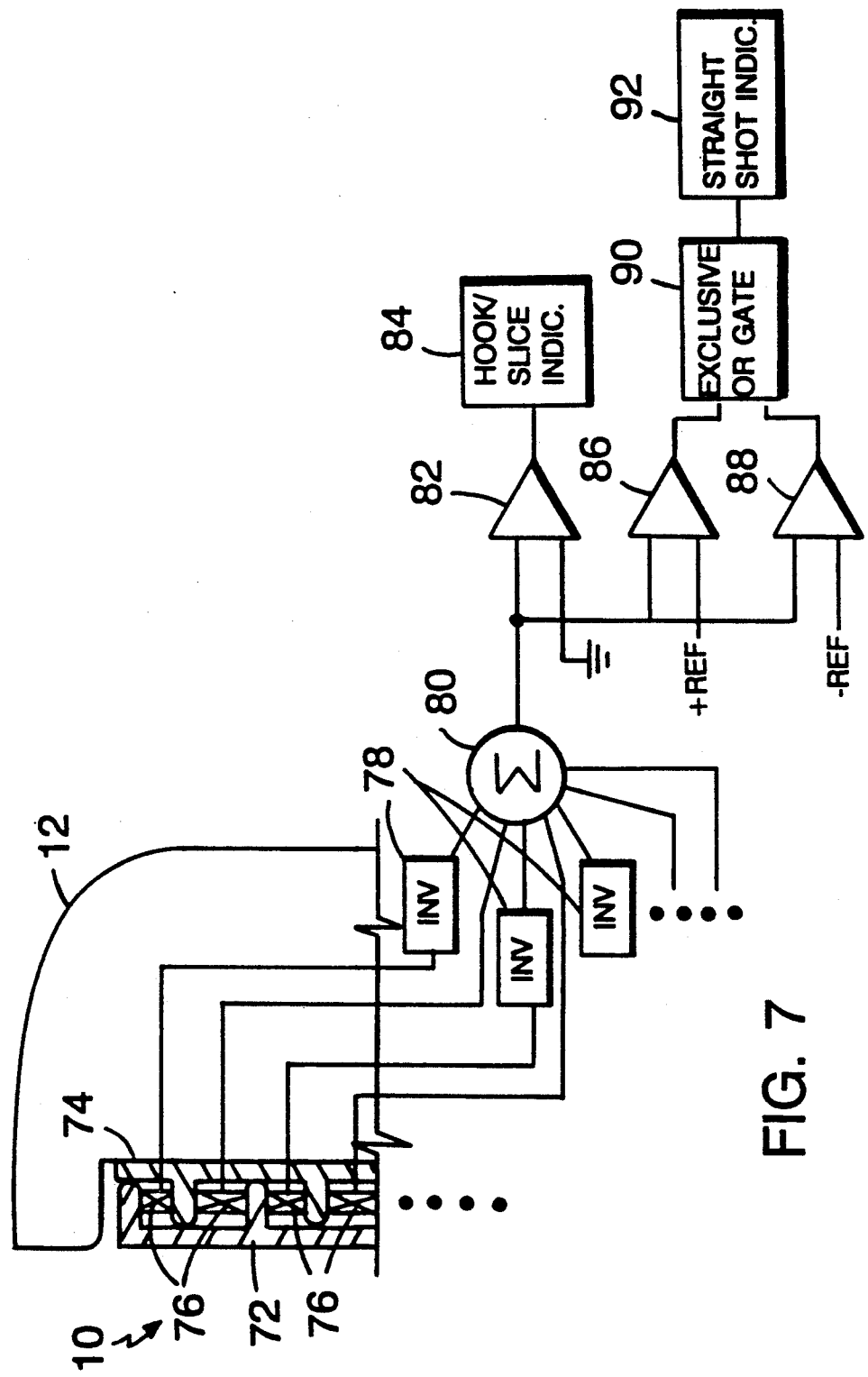

TRANSDUCING AND ANALYZING FORCES FOR INSTRUMENTED SPORTING DEVICES AND THE LIKE

BACKGROUND OF THE INVENTION

This invention relates to instrumented sporting devices, such as golf clubs, that are designed to provide to a user information such as the spin, direction of travel, curvature of the path travelled, velocity, distance travelled, etc., of a movable object, such as a golf ball, with which the sporting device comes into contact, and relates to devices for transducing forces, for use in conjunction with instrumented sporting devices and other devices.

Known sports practice devices include instrumented targets that indicate the magnitude or location of impacts from a ball or other objects. For example, Kustanovich, U.S. Pat. No. 4,659,090 discloses a target into which a golfer can hit a golf ball, a baseball player can hit a baseball, etc. The instrumented target can be arranged to calculate the speed of the ball at impact, the distance that the ball would have travelled if there were no obstructions in its path, or the direction in which the ball was hit. Other sports practice devices utilize radar, infrared detectors, or optical detectors that analyze the trajectory of a ball or other object as the ball or object travels.

Other practice devices have been designed to be incorporated directly onto sporting devices actually held by the user, such as a golf club, tennis racquet, etc. Such devices indicate to the user the location on the sporting device at which the sporting device has come into contact with a ball or other object. For example, Plutt, U.S. Pat. No. 4,898,389, discloses a training device that is attached to the head of a golf club and that indicates where on the golf club the club has come into contact with the ball. The practice device assists the user who can see the trajectory of the ball after the ball is hit, but who can not determine where on the face of the club head the head came into contact with the ball, due to the high speed at which the club moves when it comes into contact with the ball.

Shock absorbing devices are known that include a first plate having a plurality of protrusions extending from one side thereof, and a second plate positioned substantially parallel to the first plate and having at least one protrusion extending from one side thereof, the protrusion or protrusions extending from the second plate being interspaced with respect to the protrusions extending from the first plate. The shock absorber also includes a plurality of elastic elements, each of the elastic elements being located between a protrusion extending from the first plate and a protrusion extending from the second plate. Such shock absorbing devices are useful in absorbing normal forces, by transmitting shear forces into the elastic elements.

SUMMARY OF THE INVENTION

In one aspect, the invention features a device that characterizes the trajectory followed by a movable object after a piece of sporting equipment comes into contact with the movable object, e.g., by identifying the initial velocity, the distance that the object would travel if unobstructed, the direction of travel, curvature of the path travelled, or the direction or magnitude of spin of the object, thereby providing information that might in a qualitative sense be available to the user if the user were practicing on an open golf course, baseball field, etc., but that would not be available when the user is practicing in a small yard with a net, indoors with a tethered ball, etc. The device includes at least one force sensor element arranged to be located on the piece of sporting equipment, which is held or worn by a user. The sensor element detects at least one component of the force of contact between the piece of sporting equipment and the movable object. The sensor element provides a signal representing the magnitude of the component of the force of contact when the contact occurs. An electrical processing circuit is arranged to receive the signal from the sensor element and to process the signal to produce an output characterizing the trajectory of the movable object. A user notification device is arranged to receive the output from the electrical processing circuit and to present to the user information characterizing the trajectory. Devices according to the invention eliminate the need for special targets or costly radar equipment, infrared detectors, or optical detectors.

Preferred embodiments include the following features. The electrical processing circuit includes a peak detector that receives the signal from the sensor element and produces an output representing the maximum amplitude of the signal, and a level converter that receives the output of the peak detector and produces an output that represents the velocity of the movable object assuming that the movable object has a given mass. Alternatively, the output of the level converter may represent the velocity of the piece of sporting equipment immediately before contact between the piece of sporting equipment and the movable object (the velocity of the movable object after contact being a function of the velocity of the piece of sporting equipment before contact, the functional relationship being experimentally determinable). The electrical processing circuit also includes a level converter that receives the output of the peak detector and produces an output that represents the distance that the movable object would travel assuming that the movable object has a given mass and a given drag curve and assuming a flat terrain and other ideal conditions, the level converter including a memory that associates distances with possible values of the output of the peak detector.

The device preferably includes a plurality of sensor elements arranged to be positioned at differing locations on the piece of sporting equipment at which the sensor elements can detect differing components of force due to the contact between the piece of sporting equipment and the movable object. The sensor elements provide a respective plurality of signals representing the magnitude of the differing components of force due to the contact when the contact occurs. The electrical processing circuit includes a comparator that receives signals from at least two of the plurality of sensor elements and produces an output that represents the sign or magnitude of the difference between the signals, the sign and magnitude of the difference between the signals identifying the direction and magnitude of spin of the movable object, or the curvature of the path travelled by the movable object (which is directly related to the direction and magnitude of spin of the movable object), or the direction of travel of the movable object (the direction of travel of the movable object being directly related to the direction and magnitude of spin of the movable object).

The piece of sporting equipment may be any number of devices that are held or worn by a user. For example, the piece of sporting equipment may be a golf club, the movable object may be a golf ball, and the sensor elements may be arranged to be positioned at differing locations on the face of the head of the golf club.

Instrumented golf clubs according to the invention are useful as practice tools for developing a good swing. A beginning player will use such a club to learn the "rhythm" of hitting the ball correctly, thereby speeding up the learning process. A more advanced golfer will use such a club when unable to travel to a golf course or a practice driving range (where balls are hit into a field with distances marked and direction observed). Instrumented clubs according to the invention indicate to the golfer the ball's velocity, the club's velocity, the curvature of the ball's path, the direction of travel of the ball relative to the path of the club head, or the distance that the ball would travel (as at a practice range), while the player practices in a small yard or indoors with a net or tethered ball. Thus, such an instrumented club would not be used in a golf match (where its use would most likely be illegal) but is instead used for practice.

Some of today's golfers are blind. A blind golfer can use an instrumented golf club according to the invention during practice to obviate the need for an observer.

Advanced golf players put controlled amounts of side spin on the ball to bend its path to the right or left ("hook" or "slice") in order to avoid obstacles or hazards (sand traps or water). Advanced golfers also practice to determine quickly the current condition of their swings and to establish "swing keys" useful for the day's match. Thus, even advanced golfers may use an instrumented golf club according to the invention to improve their swings in which intentional side spin is desired. This technique can only be attempted after a good swing is developed, in which the club head travels in the correct path (with no side spin imparted). Instrumented golf clubs according to the invention are also useful for practicing these strokes because they indicate the amount of side spin imparted. The need for a practice range is eliminated. Also, the swing result is more apparent to the beginning golfer.

In another aspect, the invention features a shear force transducer that is especially useful in detecting the spin of an object after the transducer comes into contact with the object, the curvature of the path travelled by the object, or the direction of travel of the movable object, and may have other applications as well. The shear force transducer includes a first plate having a plurality of protrusions extending from one side thereof, and a second plate positioned substantially parallel to the first plate and having at least one protrusion extending from one side thereof, the protrusion or protrusions extending from the second plate being interspaced with respect to the protrusions extending from the first plate. The transducer also includes plurality of sensor elements, each of the sensor elements being located between a protrusion extending from the first plate and a protrusion extending from the second plate. Each sensor element provides a signal representing the intensity of force between the sensor element and the protrusions when a shear force is applied to one of the plates. A processing circuit is arranged to receive the signal from a first sensor element and the signal from a second sensor element. The first sensor element experiences a compressional force only when the shear force applied to one of the plates is in a first direction, and the second sensor element experiences a compressional force only when the shear force applied to the one of the plates is in an opposite direction. The processing circuit produces an output identifying the sign or magnitude of the shear force.

Other advantages and features will become apparent from the following description of the preferred embodiments and from the claims.

DETAILED DESCRIPTION

We first briefly describe the drawings.

DRAWINGS

FIG. 7 is a drawing of a side spin detector according to the invention.

STRUCTURE AND OPERATION

In the game of golf, the ball must be struck from rest and driven in a particular direction with great accuracy and speed (except when close to the hole or "pin"). To achieve maximum distance, the golfer must develop an easily repeatable swing in which the ball is struck while the club head (the part of the golf club upon which the ball is struck) travels at the greatest possible speed. To achieve the greatest accuracy, the ball must be struck at the center, or "sweet spot" of the club head, and at the same time the club head must be traveling in the proper path so that very little side spin is imparted to the ball.

One of the greatest challenges in the game of golf is developing a good swing. Three elements of the swing are the most critical to golf:

1) Point of contact. The ball must be struck at the center ("sweet spot") of the club face if a straight, long hit is to result. A golf ball struck off of the sweet spot receives a glancing blow and does not track far. The sweet spot is located directly over the club head center of mass and the club head center of mass must be directly behind the ball for a good hit.

2) Speed. Long hitting distance can only be obtained by developing great speed.

3) Correct club head path. When the ball is struck, the club head must be traveling in the proper path to avoid excessive side spin on the ball, which can result in a "slice" (ball curves to the right for the right handed golfer) or "hook" (ball curves left). "Slices" and "hooks" are a very common problem for the average golfer. Often, these shots are hit with so much side spin that the ball ends up in the woods or a hazard causing the loss of one or two strokes. Side spin will also decrease the ball's flight distance.

Figure 1:
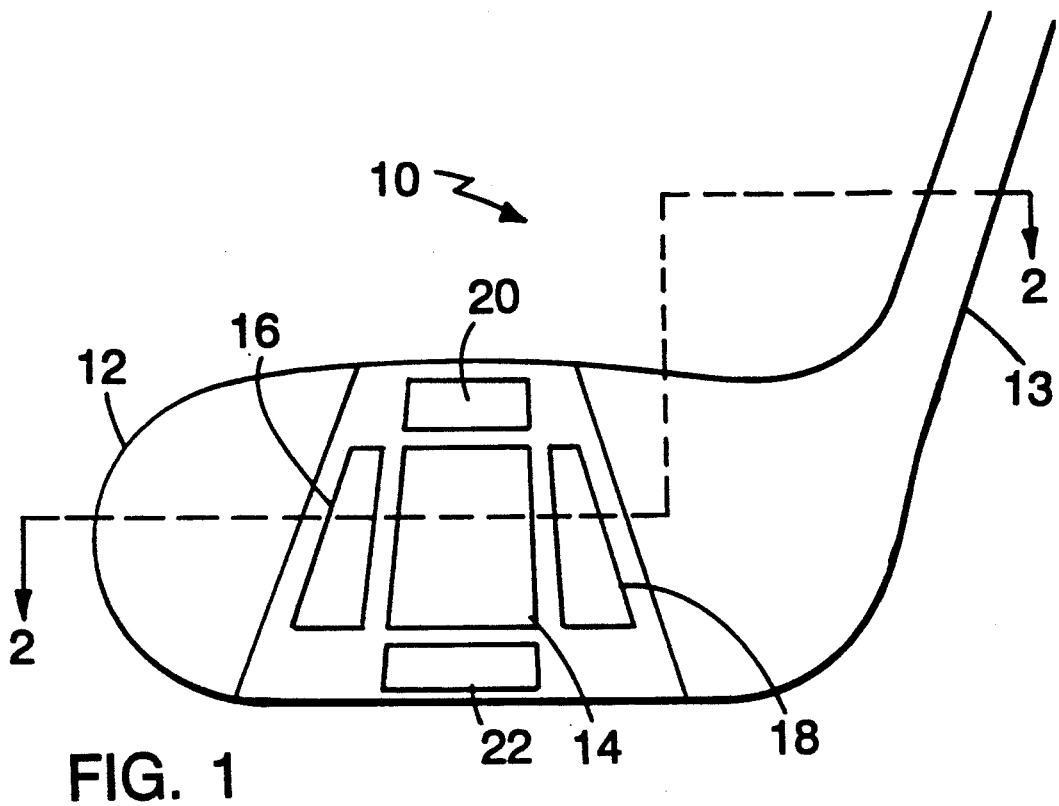
FIG. 1 is a drawing of the face of the head of a golf club according to the invention, showing the locations of sensor elements located within the club head.
Figure 2:
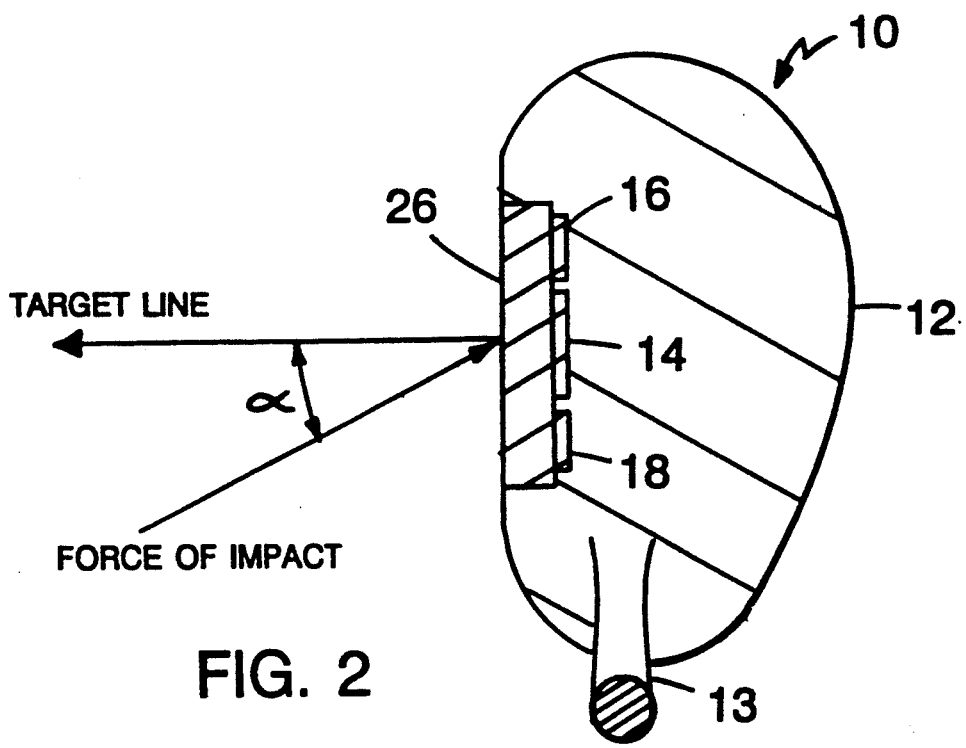
FIG. 2 is a sectional view of the club head of FIG. 1, taken along line 2—2 in FIG. 1.

Referring to FIGS. 1 and 2, golf club 10 includes shaft 13 and club head 12. Mounted on head 12 are a symmetrical array of PVDF (polyvinylidene fluoride) film sensor elements, including central sensor 14, toe sensor 16, heel sensor 18, top sensor 20, and bottom sensor 22. The PVDF film sensor elements provide a voltage output proportional to the impulsive force applied to a golf ball by golf club 10 at the various locations at which the sensor elements are positioned. PVDF film is used because of its 0 extremely rugged qualities and because of its light weight. The sensor array shown fits behind a metal plate 26 that is attached to the club face. This plate protects the array from abrasion by the ball or other objects.

Figure 3:
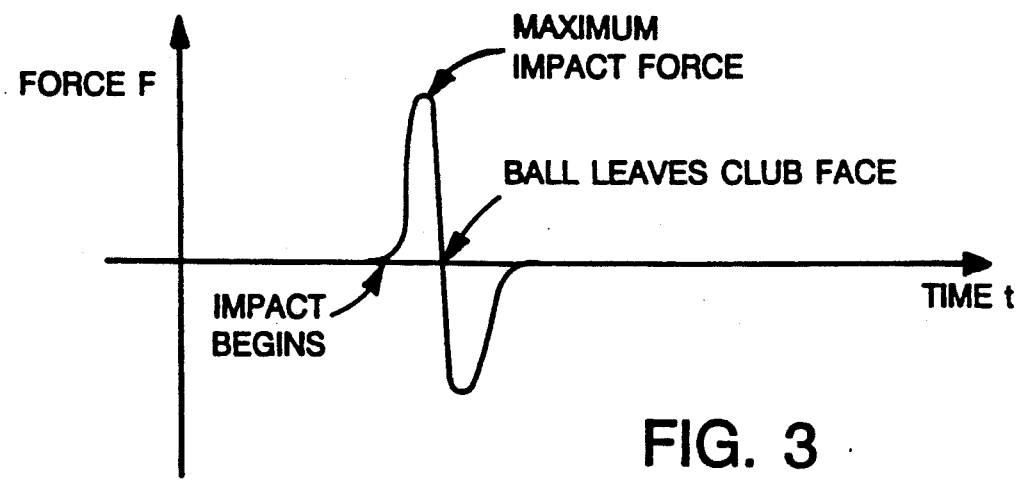
FIG. 3 is a diagram showing force as a function of time, as measured by a sensor element located within the head of a golf club according to the invention

The output of each sensor is a voltage that is proportional to the force applied to the ball and that has the form indicated in FIG. 3. The maximum value of the impact force is believed to be directly related to the initial velocity of the ball and also to the distance that would be traveled by the ball if the ball were unobstructed. In other words, with standard conditions of humidity, temperature, altitude, and ball construction, on a level fairway, the ball's flight distance is a single-valued function of the maximum value of the impact force, if the ball is struck at the sweet spot with no side spin. It is the intent of the circuitry design described below to determine this maximum value of the impact force, to determine, based on this maximum value, the initial velocity of the ball or the velocity of the club head before contact with the ball, the distance that would be travelled by the ball under certain ideal conditions, whether the impact occurred at the sweet spot, and whether the impact imparted any side spin to the ball.

Figure 4:
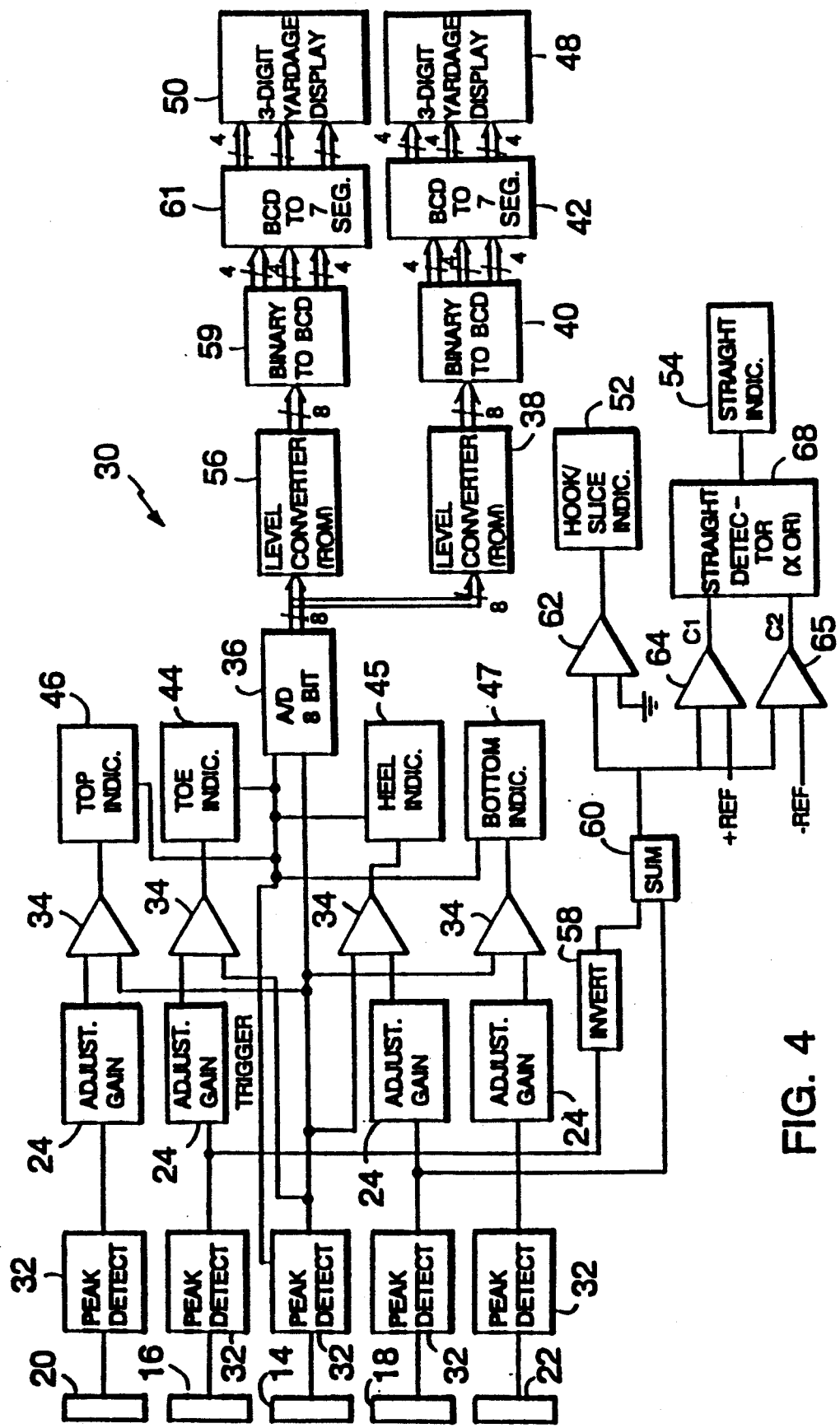
FIG. 4 is a circuit diagram of a circuit according to the invention that receives the outputs of sensor elements located within the head of a golf club and produces display outputs.

Referring to FIG. 4, there is shown a basic microelectronic circuit 30 that is wired to the five-sensor array of a golf club according to the invention. Circuit 30 must be connected to a power supply (small battery). All of the electronic components are available off-the-shelf, but the circuit may also be incorporated into a custom miniature integrated circuit containing all of the circuitry in a single chip, the integrated circuit preferably being mounted in the club head.

The sensor outputs (voltages) are fed into a five-element array of peak detectors 32. Detectors 32 find the instant of time at which the sensor voltages are maximum. At this identified instant in time, the voltages are frozen at this maximum level until circuit 30 is reset. A trigger signal is generated by the peak detector associated with central sensor 14 when the signal from central sensor 14 hits its peak, to indicate that the voltages are available for processing.

Central sensor 14, the only sensor located at the sweet spot, is used for calculating the impulsive force of the golf club on the golf ball. The impulsive force is used to determine the initial velocity of the ball or the club head velocity, and is also used to determine the distance of flight of the ball under certain ideal conditions.

The impulsive force relates to the initial velocity of the ball via the relation:

$$\int_0^{\Delta t} \vec{f} \, dt = m \cdot \vec{v} \qquad \text{(Equation 1)}$$

where f is the impulsive force, m is the mass of the ball, and v is the initial velocity of the ball. In order to determine the initial velocity of the ball, the peak voltage measured by central sensor 14 is fed into an 8-bit flash type analog-to-digital converter 36. When a peak is detected, the trigger signal activates analog-to-digital converter 36, which produces an 8-bit digital (binary) output proportional to the sweet spot peak voltage. The digital output is fed into a level converter 38. This unit is a ROM (read-only-memory) that produces a binary velocity output based on the 8 bit output of A/D converter 36. ROM 38 is preprogrammed using experimentally determined values that assume that the golf ball has a standard mass. The ROM output is then converted to a 3 digit number by binary-to-BCD converter 40 and BCD-to-seven segment converter 42, and displayed by LCD display 48.

Because the velocity of the club head before contact with the ball is directly related to the velocity of the ball after contact via the relation:

$$m_1 v_1 = m_2(v_2 - v_3) \qquad \text{(Equation 2)}$$

where $m_1$ is the mass of the ball, $v_1$ velocity of the ball after contact, $m_2$ is the mass of the club head, $v_2$ is the velocity of the club head before contact, and $v_3$ is the velocity of the club head after contact, ROM 38 may alternatively be preprogrammed using experimentally $v_2$ of the club head before contact with the ball rather than the velocity $v_1$ of the ball after contact.

The force measured by the PVDF sensors is also converted into a distance of travel for the ball. The flight distance values to be associated with the various values of impulsive force are determined through calculation and experimentation. Several factors influence the ball's flight distance besides the initial velocity of the ball. These factors include: the initial direction of the ball, initial side spin and top (or back) spin, initial temperature of the ball, the type of ball, initial launch angle of the ball, wind, the slope of the ground (uphill or downhill), humidity, altitude and ball construction (dimpling and material that influences both spin and air drag). The computations assume standard conditions of no wind, flat ground, standard humidity, temperature, and altitude, standard launch angle, and a certain ball construction. These standard conditions may be, for example, any of the standard ideal conditions established by various golfers' associations such as the U.S.-G.A. Given a known impulsive force and assuming these standard conditions, the flight distance can be determined from the initial velocity (determined from Equation (1)) and the known drag curve of a golf ball. The drag curve is a plot of the ball's drag coefficient vs. Reynold's number. The effect of air drag on flight distance is an integrated effect over the entire flight of the ball.

ROM (read-only-memory) 56 produces a binary yardage output based on the 8-bit output of A/D converter 36. ROM 56 is preprogrammed using experimentally determined values. The ROM output is then converted to a 3 digit number by binary-to-BCD converter 59 and BCD-to-seven segment converter 61, and displayed by LCD display 50.

The instrumented club also indicates the point of contact with the ball. The peak value of each force curve measured at toe sensor 16, heel sensor 18, top sensor 20, and bottom sensor 22 is passed through a respective adjustable gain 24 and compared, by one of a set of comparators 34, with the peak of the force curve measured at central sensor 14. If the adjusted peak value from sensor 16, 18, 20, or 22 exceeds the peak value from central sensor 14, a respective toe hit indicator 44, heel hit indicator 45, top hit indicator 46, or bottom hit indicator 47 indicates that the point of contact was at the toe, heel, top, or bottom of the club head, respectively. The optimal value of gain to be provided by adjustable gains 24 can be determined experimentally. Thus, the instrumented club not only indicates to the golfer that the ball was or was not hit at the sweet spot, but also where the point of contact occurred (heel, toe, top, or bottom).

Figure 5:
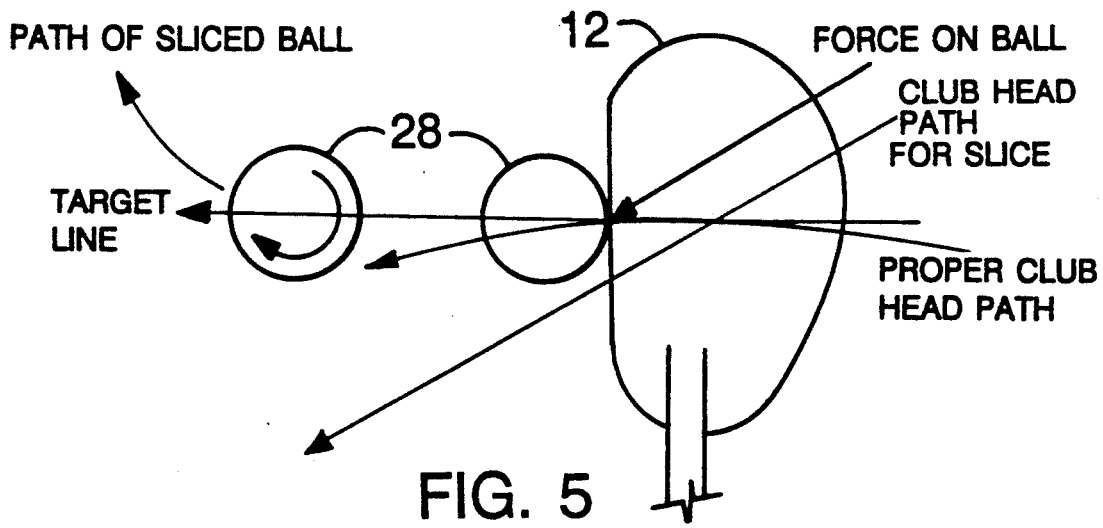
FIG. 5 is a drawing showing a proper club head path, a club head path for a slice, and the path of a sliced ball.
Figures 5A, 5B:
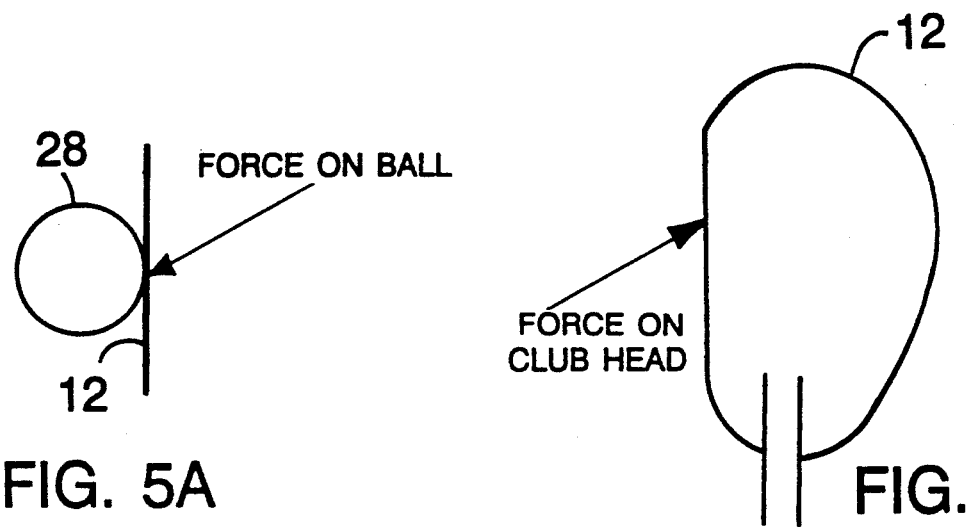
FIG. 5A is a drawing showing the force on a sliced ball.
FIG. 5B is a drawing showing the force on the head of a golf club during a slice.

The instrumented golf club also indicates the direction and magnitude of the side spin on the ball. Preliminarily, it will be helpful to understand how a "slice" and a "hook" result from the side spin imparted to the golf ball. Referring to FIGS. 5, 5A, and 5B, the club head path and resulting impact on the ball 28 are shown for a slice hit by a right handed golfer. The result of this improper club head path is that at impact the force applied to ball 28 is not perpendicular to the face of the club (or through the club head's mass center) even though the impact may occur at the sweet spot. The path of club head 12 shown in FIG. 5 starts outside of the target line (away from the golfer) before impact and ends up inside the target line after impact. The opposite situation occurs with respect to a "hooked" ball.

Figure 6:
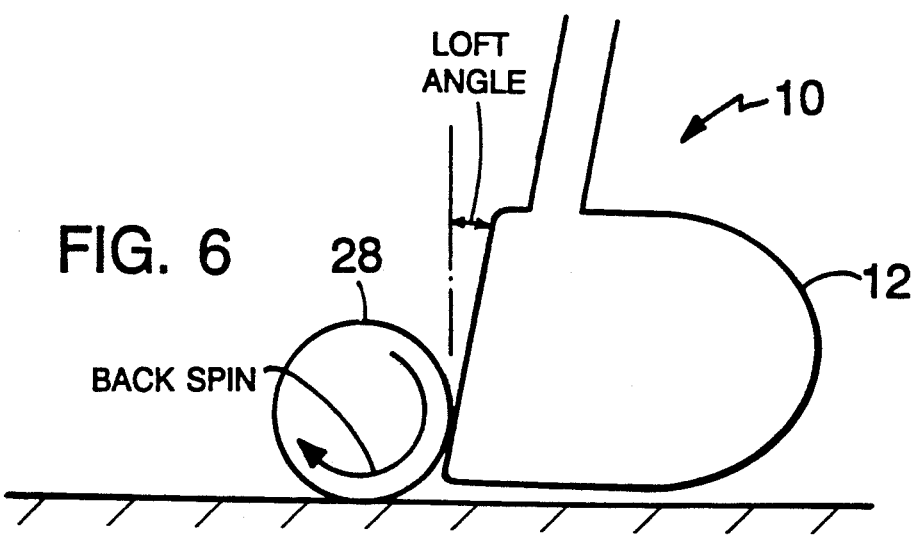
FIG. 6 is a drawing showing a golf club imparting back spin to a golf ball.

It may also be helpful to understand top spin and back spin. Referring to FIG. 6, the top or back spin and the initial loft angle of ball 28 are controlled by the loft of club 10 (the angle the club face makes with vertical) and whether ball 28 is hit before or after club head 12 is at its lowest point in the swing. Top spin and back spin are not usually as big a problem for most golfers as is side spin because the loft angle of the club face automatically imparts some back spin on the ball. Back spin reduces the amount of roll the ball makes after landing and advanced golfers use this spin to "hold" the hit ball on the putting green. The novice golfer is usually able to allow his shots to "run up" onto the green if he cannot put enough back spin onto the ball to stop it on the green.

Figure 2A:
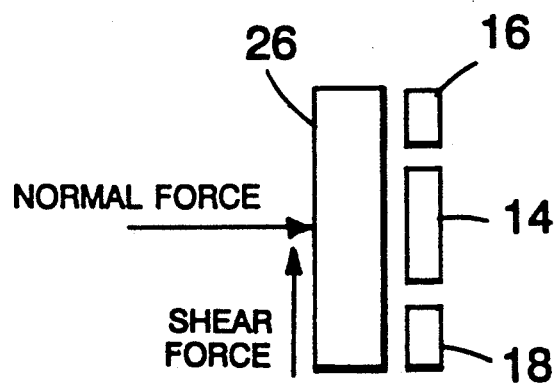
FIG. 2A is a force diagram showing the forces on the metal plate on the face of the club head of FIGS. 1 and 2.
Figure 2B:
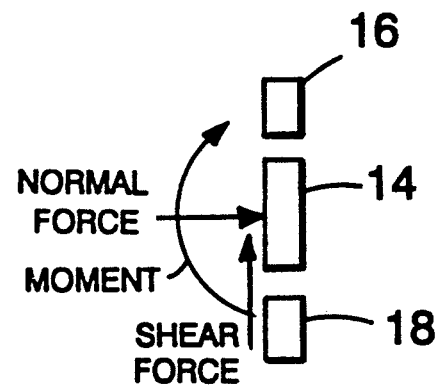
FIG. 2B is a force diagram showing the forces on the sensor elements located within the club head of FIGS. 1 and 2.

The PVDF array may be used to indicate the direction of side spin and the amount of side spin imparted to the ball. Referring to FIG. 2, if the bulk of the force of the impact occurs at the sweet spot (so that central sensor 14 registers the maximum impact force of all of the sensors), the angle that the force makes with the club face can be determined by comparing the forces measured by toe sensor 16 and heel sensor 18 with each other. As shown in FIG. 2A, the angle of the impact causes both shear and normal forces to be imparted to club 10. The shear force imparts the spin on the ball. As shown in FIG. 2B, because the sensors are behind metal plate 26, the forces on the sensors include not only normal and shear forces, but a moment as well. This moment causes the force measured by one of the toe or heel sensors 16 and 18 to be greater than the other. Therefore, as explained in detail below, the toe and heel sensor outputs are compared to determine the amount and direction of any side spin imparted to the ball. Note also that a side spin is imparted to the ball if the club head is in the proper path but the club face is not aligned normal to this path. The PVDF sensor array indicates a side spin under this condition as well. The outputs of the top and bottom sensors could also be compared with each other to determine the direction and magnitude of the top spin or back spin imparted to the ball.

The side-spin portion of the circuit of FIG. 4 contains an inverter 58 and summer 60 that determine the voltage differential between the output of heel sensor 18 and toe sensor 16. Comparator 62 compares this differential to ground (zero volt) and produces a signal that is positive if a slice spin was imparted to the ball and negative if a hook was imparted to the ball. The magnitude of the signal represents the magnitude of the spin. The direction and magnitude of the hook or slice spin is indicated on LCD hook/slice indicator 52. Comparators 64 and 66 compare the voltage differential from comparator 62 to both a positive reference voltage and its additive inverse. The reference voltage is a small, adjustable threshold voltage, and, if the absolute value of the voltage differential is less than the reference voltage, the side spin is negligible. The optimal value of the reference voltage may determined through experimentation. The outputs of the positive and negative reference voltage comparators are received by straight detector (exclusive OR gate) 68 to determine whether the shot had negligible side spin (a straight shot). The result is displayed on straight shot LCD indicator 54.

Figure 4A:
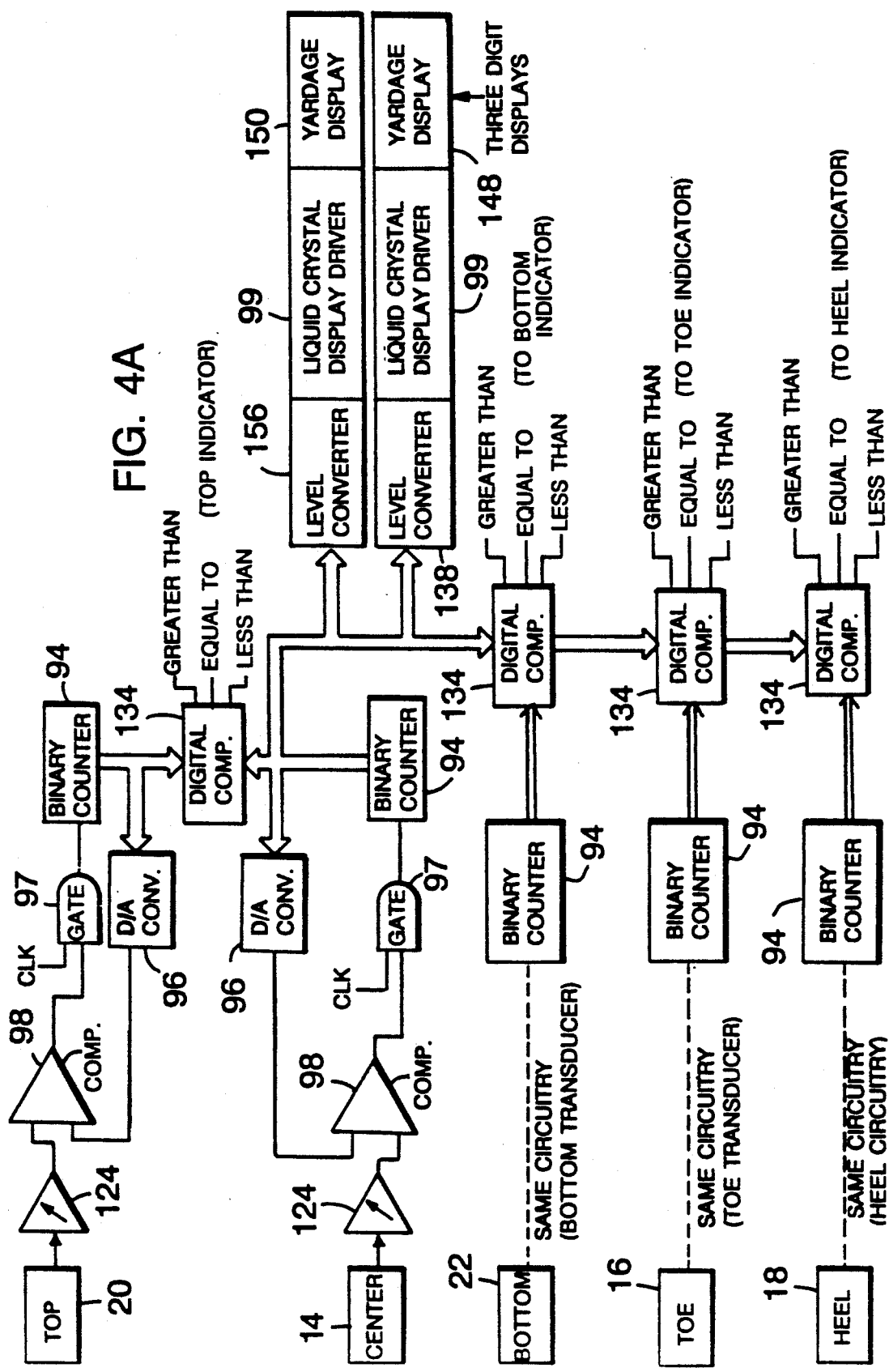
FIG. 4A is a circuit diagram of an alternative circuit according to the invention that receives outputs of sensor elements located within the head of a golf club and produces display outputs.

FIG. 4A depicts an alternative golf swing monitoring circuit that determines velocity, yardage, and location of impact and displays the results. The circuit of FIG. 4A uses digital techniques for peak detection. The signals from the sensor elements pass through gains 124 and the signal peaks are detected by peak detectors that consist of digital counters 94, D/A converters 96, analog comparators 98, and gates 97 for inhibiting the clock input to the counter when the peak has been measured. Each digital counter 94 starts counting at zero, counts up, and stops at a number corresponding to the peak of the signal received from the sensor element. Digital counters 94 are reset manually. Digitally magnitude comparators 134 compare the binary counter output of the sweet-spot channel with the outputs of all of the other channels, to determine the relative levels of the outputs of the five sensors. If any sensor output is greater than or equal to the output of the sweet spot sensor (central sensor 14), the appropriate top, bottom, heel, or toe indicator indicates a hit at the top, bottom, heel or toe, respectively, of the club head. The circuit of FIG. 4A also includes level converters 156 an 138, which are analogous to level convergers 56 and 38 of FIG. 4, and yardage display 150 and velocity display 148, which are analogous to display 50 and 48 of FIG. 4. Liquid crystal display drivers 99 drive the displays.

The advantage of a digital peak detector is that it provides a stable peak reading with infinite memory. I.e., there is no drift as with an analog peak detector. The peak detector can be reset quickly. It is not necessary to allow time for capacitors to discharge. Binary counters 94 perform the analog-to-digital conversion that is required for level converters 156 and 138.

In another embodiment of the invention, shown in FIG. 7, the side spin detector is constructed using a separate spin sensor 70 positioned on the face of a club head 12. A portion of club head 12, including a portion of spin sensor 70, is shown in horizontal cross section. Spin sensor 70 must be sensitive to the shear force applied to the ball, but at the same time insensitive to the normal force. Spin sensor 70 is constructed with two parallel metal plates 72 and 74, the plates having finger-like protrusions that are interspaced with respect to each other. Force sensors 76 are inserted between the plates as shown and glued to the finger-like protrusions. A set of inverters 78 invert the outputs of every other force sensor, and summer 80 sums the inverted sensor outputs with the other sensor outputs. Because the outputs of sensors 76 are alternately inverted, adjacent sensor voltages cancel during a straight shot. As a result, the output of summer 80 is unresponsive to the normal force imparted on a straight shot. When side spin is imparted to the ball, however, a shear force is applied to metal plate 72, causing a compressional force to be applied either to the force sensors 76 whose outputs are inverted or to the force sensors whose outputs are not inverted, depending on the direction of the shear force, and causing tensile force to be applied to the force sensors that do not experience the compressional force. Consequently, the summer output is proportional to the side spin imparted to the ball. If sensors 76 are connected to produce a positive voltage for a compressional force, spin sensor 70 will produce a positive voltage for slice spin and a negative voltage for a hook spin. The remaining circuitry, including voltage comparator 82, hook/slice indicator 84, comparators 86 and 88, exclusive OR gate 90, and straight shot indicator 92, operates in a manner that is similar to that of the previously described embodiment.

Other embodiments are within the following claims. E.g., many other types of sports equipment held or worn by a user and relating to sports involving hand-eye coordination could benefit from this type of device, thereby eliminating the need to actually observe the trajectory of an object that comes into contact with the piece of sports equipment. An instrumented tennis or ping-pong racquet according to the invention could indicate the initial speed of the tennis or ping-pong ball after it is hit and whether the ball is hooked or sliced. An instrumented hockey stick according to the invention could indicate the speed of the puck relative to the stick. An instrumented baseball bat according to the invention, to be used in batting cages, could indicate the initial speed of the baseball after being hit and whether the hit is a pop-up, "line drive," or a grounder.

What is claimed is:

1. A device, designed for use in conjunction with a piece of sporting equipment held or worn by a user, for characterizing a trajectory followed by a movable object after an object-striking face of said piece of sporting equipment comes into contact with said movable object, comprising an impact sensor comprising a plurality of impact force sensing elements, said impact sensor being incorporated into said object-striking face of said piece of sporting equipment in a manner such that each of said impact force sensing elements can experience compressional or tensile force upon impact between said piece of sporting equipment and said movable object, each of said impact force sensing elements providing a respective signal representing the intensity of said compressional or tensile force when said contact between said movable object and said piece of sporting equipment occurs, said plurality of impact force sensing elements being arranged to be positioned at differing locations on said piece of sporting equipment at which said impact force sensing elements receive differing compressional or tensile forces due to impact between said piece of sporting equipment and said movable object, an electrical processing circuit arranged to receive said signals from said impact force sensing elements and to process said signals to produce an output characterizing said trajectory of said movable object, and a user notification device arranged to receive said output from said electrical processing circuit and to present to said user information characterizing said trajectory, said information characterizing said trajectory comprising the direction of travel of said movable object relative to said piece of sporting equipment.

2. A device in accordance with claim 1 wherein said information characterizing said trajectory further comprises the distance that said movable object would travel, relative to the point of said contact with said piece of sporting equipment, if said trajectory were unobstructed.

3. A device in accordance with claim 2, wherein said electrical processing circuit comprises a peak detector that receives said signal from one of said impact force sensing elements and produces an output representing the maximum amplitude of said signal, and a level converter that receives said output of said peak detector and produces an output that represents said distance that said movable object would travel assuming that said movable object has a given mass and a given drag curve, said level converter comprising a memory that associates distances with possible values of said output of said peak detector.

4. A device in accordance with claim 1, wherein said information characterizing said trajectory further comprises velocity.

5. A device in accordance with claim 4, wherein said velocity comprises the initial velocity of said movable object after contact between said piece of sporting equipment and said movable object.

6. A device in accordance with claim 4, wherein said velocity comprises the velocity of said piece of sporting equipment immediately prior to contact between said piece of sporting equipment and said movable object, the initial velocity of said movable object after contact being a function of said velocity of said piece of sporting equipment before contact.

7. A device in accordance with claim 4, wherein said electrical processing circuit comprises a peak detector that receives said signal from one of said impact force sensing elements and produces an output representing the maximum amplitude of said signal, and a level converter that receives said output of said peak detector and produces an output that represents said velocity of said movable object assuming that said movable object has a given mass.

8. A device in accordance with claim 1 wherein said electrical processing circuit comprises a comparator that receives signals from at least two of said plurality of impact force sensing elements and produces an output that represents the sign or magnitude of the difference between said signals, the sign and magnitude of the difference between said signals identifying the direction of travel of said movable object.

9. A device in accordance with claim 8, wherein said at least two of said plurality of impact force sensing elements are arranged to be located on opposing sides of a location on said piece of sporting equipment at which said movable object is most likely to come into contact with said piece of sporting equipment.

10. A device in accordance with claim 8, further comprising
at least one plate arranged and configured to be positioned on said piece of sporting equipment in a manner such that said plate transmits a shear component of impact force between said movable object and said piece of sporting equipment, as a compressional force to at least a first of said plurality of impact force sensing elements only if said shear component of impact force is in a first direction, and as a compressional force to at least a second of said plurality of impact force sensing elements only if said shear component of impact force is in a second direction,
said comparator receiving signals from said at least a first of said plurality of impact force sensing elements and said at least a second of said plurality of impact force sensing elements, and producing an output that represents the sign or magnitude of the difference between said signals.

11. A device in accordance with claim 1 wherein
said piece of sporting equipment comprises a golf club,
said movable object comprises a golf ball, and
said impact force sensing elements are arranged to be positioned at differing locations on the face of the head of said golf club.

12. A device, designed for use in conjunction with a piece of sporting equipment, for characterizing the spin of a movable object with which an object-striking force sensing elements, said impact sensor being incorporated into said object-striking face of said piece of sporting equipment in a manner such that said impact force sensing elements can experience compressional or tensile force upon impact between said piece of sporting equipment and said movable object, said impact force elements providing a plurality of respective signals representing the intensity of said compressional or tensile force when said contact between said movable object and said piece of sporting equipment occurs, said plurality of impact force sensing elements being arranged to be positioned at differing locations on said piece of sporting equipment at which said impact force sensing elements receive differing compressional or tensile forces due to impact between said piece of sporting equipment and said movable object,
an electrical processing circuit arranged to receive said signals from said impact force sensing elements and to process said signals to produce an output characterizing said spin of said movable object, and
a user notification device arranged to receive said output from said electrical processing circuit and to present to said user information characterizing said spin.

13. A device in accordance with claim 12 wherein said information characterizing said spin comprises the direction of said spin of said movable object.

14. A device in accordance with claim 12 wherein said information characterizing said spin comprises the magnitude of said spin of said movable object.

15. A device in accordance with claim 12 wherein said information characterizing said spin characterizes curvature of a path travelled by said movable object after said piece of sporting equipment comes into contact with said movable object.

16. A device in accordance with claim 12, wherein
said electrical processing circuit comprises a comparator that receives signals from at least two of said plurality of impact force sensing elements and produces an output that represents the sign or magnitude of the difference between said signals, the sign of the difference between said signals identifying the direction of spin of said movable object and the magnitude of the difference between said signals identifying the magnitude of spin of said movable object, and
said at least two of said plurality of impact force sensing elements are arranged to be located on opposing sides of a location on said piece of sporting equipment at which said movable object is most likely to come into contact with said piece of sporting equipment.

17. A device in accordance with claim 12, wherein
said electrical processing circuit comprises a comparator that receives signals from at least two of said plurality of impact force sensing elements and produces an output that represents the sign or magnitude of the difference between said signals, the sign of the difference between said signals identifying the direction of spin of said movable object and the magnitude of the difference between said signals identifying the magnitude of spin of said movable object,
said device further comprises at least one plate arranged and configured to be positioned on said piece of sporting equipment in a manner such that said plate transmits a shear component of impact force between said movable object and said piece of sporting equipment, as a compressional force to at least a first of said plurality of impact force sensing elements only if said shear component of impact force is in a first direction, and as a compressional force to at least a second of said plurality of impact force sensing elements only if said shear component of impact force is in a second direction, and
said comparator receives signals from said at least a first of said plurality of impact force sensing elements and said at least a second of said plurality of impact force sensing elements, and produces an output that represents the sign or magnitude of the difference between said signals.

18. A device in accordance with claim 12 wherein
said piece of sporting equipment comprises a golf club,
said movable object comprises a golf ball, and
said impact force sensing elements are arranged to be positioned at differing locations on the face of the head of said golf club.

19. Sporting apparatus, comprising
a piece of equipment held or worn by a user, and
a device for characterizing a trajectory followed by a movable object after an object-striking face of said piece of equipment comes into contact with said movable object, said device comprising an impact sensor comprising a plurality of impact force sensing element, said impact sensor being incorporated into said object-striking face of said piece of equipment in a manner such that each of said impact force sensing elements can experience compressional or tensile force upon impact between said piece of equipment and said movable object, each of said impact force sensing elements providing a respective signal representing the intensity of said compressional or tensile force when said contact between said movable object and said piece of equipment occurs, said plurality of impact force sensing elements being arranged to be positioned at differing locations on said piece of sporting equipment at which said impact force sensing elements receive differing compressional or tensile forces due to impact between said piece of sporting equipment and said movable object, an electrical processing circuit arranged to receive said signals from said impact force sensing elements and to process said signals to produce an output characterizing said trajectory of said movable object, and a user notification device arranged to receive said output from said electrical processing circuit and to present to said user information characterizing said trajectory, said information characterizing said trajectory comprising the direction of travel of said movable object relative to said piece of equipment.

20. Sporting apparatus, comprising a piece of equipment designed for sporting purposes, and a device for characterizing the spin of a movable object with which an object-striking face of said piece of equipment comes into contact, comprising an impact sensor comprising a plurality of impact force sensing elements, said impact sensor being incorporated into said object striking face of said piece of equipment in a manner such that said impact force sensing elements can experience compressional or tensile force upon impact between said piece of equipment and said movable object, said impact force sensing elements providing a plurality of respective signals representing the intensity of said compressional or tensile force when said contact between said movable object and said piece of equipment occurs, said plurality of impact force sensing elements being arranged to be positioned at differing locations on said piece of sporting equipment at which said impact force sensing elements receive differing compressional or tensile forces due to impact between said piece of sporting equipment and said movable object, an electrical processing circuit arranged to receive said signals from said impact force sensing elements and to process said signals to produce an output characterizing said spin of said movable object, and a user notification device arranged to receive said output from said electrical processing circuit and to present to said user information characterizing said spin.

21. A shear force transducer comprising a first plate having a plurality of protrusions extending from one side thereof, a second plate positioned substantially parallel to said first plate and having a plurality of protrusions extending from one side thereof, said protrusions extending from said second plate being interspaced with respect to said protrusions extending from said first plate, a plurality of sensor elements, each of said sensor elements being located between a protrusion extending from said first plate and a protrusion extending from said second plate, each of said sensor elements providing a signal representing the intensity of force between said element and said protrusions when a shear force is applied to one of said plates, said shear force applied to said one of said plates being in a direction parallel to said one of said plates and said force between each of said sensor elements and said protrusions being in a direction parallel to said one of said plates, and a processing circuit arranged to receive said signal from at least a first of said sensor elements and said signal from at least a second of said sensor elements, said at least a first of said sensor elements experiencing a compressional force only when a shear force is applied to one of said plates in a first direction, said at least a second of said sensor elements experiencing compressional force only when a shear force is applied to said one of said plates in an opposite direction, said processing circuit producing an output identifying the sign or magnitude of said shear force.

22. A device, designed for use in conjunction with a piece of sporting equipment held or worn by a user, for characterizing a trajectory followed by a movable object after an object-striking face of said piece of sporting equipment comes into contact with said movable object, comprising an impact sensor comprising at least one impact force sensing element, said impact sensor being incorporated into said object-striking face of said piece of sporting equipment in a manner such that said impact force sensing element can experience compressional or tensile force upon impact between said piece of sporting equipment and said movable object, said impact force sensing element providing a signal representing the intensity of said compressional or tensile force when said contact between said movable object and said piece of sporting equipment occurs, an electrical processing circuit arranged to receive said signal from said impact force sensing element and to process said signal to produce an output characterizing said trajectory of said movable object, said electrical processing circuit comprising a peak detector arranged to detect a peak value of said signal from said impact force sensing element, said electrical processing circuit further comprising a memory arranged to receive said peak value as an input and preprogrammed with experimentally determined values that relate each of a plurality of possible peak values of said signal with a respective output value characterizing said trajectory, a user notification device arranged to receive said output from said electrical processing circuit and to present to said user information characterizing said trajectory.

* * * * *

UNITED STATES PATENT AND TRADEMARK OFFICE
CERTIFICATE OF CORRECTION

PATENT NO. : 5,209,483

DATED : May 11, 1993

INVENTOR(S) : Charles J. Gedney, Philip A. Abbot

It is certified that error appears in the above-identified patent and that said Letters Patent are hereby corrected as shown below:

On the Title Page:

In the "[56]" References Cited "Other Publications" Section:

delete second occurrence of "Computer Golf Pro" reference;

col. 5, line 22, after "its" delete --0--;

col. 6, line 39, before "$V_2$" insert --determined values to provide as the ROM output the velocity-- ;

col. 11, line 41, "force" should be --face--;

col. 11, line 42, before "sensing" insert --of said piece of sporting equipment comes into contact, comprising an impact sensor comprising a plurality of impact force--.

Signed and Sealed this

Twenty-third Day of August, 1994

Attest:

BRUCE LEHMAN

Attesting Officer

Commissioner of Patents and Trademarks